United States Patent [19]

Okada et al.

[11] Patent Number: 5,204,903
[45] Date of Patent: Apr. 20, 1993

[54] SECURE COMMUNICATION EQUIPMENT AND SECURE TRANSMISSION SYSTEM

[75] Inventors: Kenji Okada; Fumio Mano; Nobuyuki Tokura; Kiyomi Kumozaki; Noriki Miki, all of Kanagawa, Japan

[73] Assignee: Nippon Telegraph and Telephone Corporation, Tokyo, Japan

[21] Appl. No.: 786,799

[22] Filed: Nov. 5, 1991

[30] Foreign Application Priority Data

Nov. 5, 1990 [JP] Japan .................. 2-299492

[51] Int. Cl.⁵ .............................................. H04L 9/02
[52] U.S. Cl. .......................................... 380/46; 380/21; 380/47
[58] Field of Search .................. 380/21, 23, 42, 43, 380/44, 46, 47

[56] References Cited

U.S. PATENT DOCUMENTS

| | | | |
|---|---|---|---|
| 4,663,500 | 5/1987 | Okamoto et al. | 380/47 |
| 4,926,478 | 5/1990 | Gruenberg | 380/21 |
| 4,961,221 | 10/1990 | Abiven | 380/21 |
| 5,008,938 | 4/1991 | Freeburg et al. | 380/43 X |

OTHER PUBLICATIONS

J. Svigals; IBM Technical Disclosure Bulletin; vol. 25, No. 1, 1982; p. 279; "Dynamic Communication Key Accumulated from . . . ".

*Primary Examiner*—Tod R. Swann
*Attorney, Agent, or Firm*—Pollock, VandeSande and Priddy

[57] ABSTRACT

In a secure transmission system in which first and second pieces of communication equipment are interconnected via a transmission line, the first communication equipment has a conversion part for encrypting an information signal to be transmitted, through utilization of a received signal and the second communication equipment has an information memory for storing, as a key information, information to be transmitted to the first communication equipment and an inverse conversion part in which the encrypted signal received from the first communication equipment is decoded using the key information read out of the information memory. As the transmission information signal varies, the key information also varies accordingly. Hence, a highly secure transmission system and secure communication equipment can be realized.

24 Claims, 11 Drawing Sheets

TABLE I

| COMM EQUIP 100A | COMM EQUIP 100B |
|---|---|
| $B_0$ : 0 0 0 0 0 0 0 0 | $B_0$ : 0 0 0 0 0 0 0 0 |
| $A_1$ : 1 0 1 0 1 0 1 0 | $A_1'$ : 1 0 1 0 1 0 1 0 |
| $A_1 \oplus B_0 = A_1'$ : 1 0 1 0 1 0 1 0 | $A_1' \oplus B_0 = A_1$ : 1 0 1 0 1 0 1 0 |
| $B_1'$ : 1 0 1 0 0 1 0 1 | $B_1$ : 0 0 0 0 1 1 1 1 |
| $A_1 \oplus B_1' = B_1$ : 0 0 0 0 1 1 1 1 | $A_1 \oplus B_1 = B_1'$ : 1 0 1 0 0 1 0 1 |
| $A_2$ : 0 0 1 1 0 0 1 1 | $A_2'$ : 0 0 1 1 1 1 0 0 |
| $A_2 \oplus B_1 = A_2'$ : 0 0 1 1 1 1 0 0 | $A_2' \oplus B_1 = A_2$ : 0 0 1 1 0 0 1 1 |
| $B_2'$ : 1 1 0 1 0 0 0 1 | $B_2$ : 1 1 1 0 0 0 1 0 |
| $A_2 \oplus B_2' = B_2$ : 1 1 1 0 0 0 1 0 | $A_2 \oplus B_2 = B_2'$ : 1 1 0 1 0 0 0 1 |

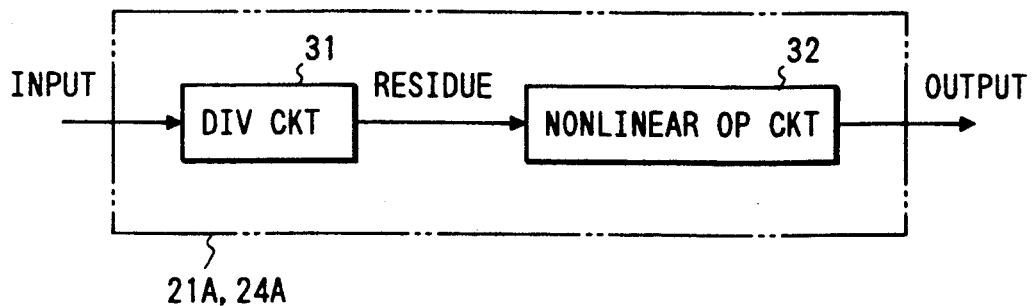
FIG. 6
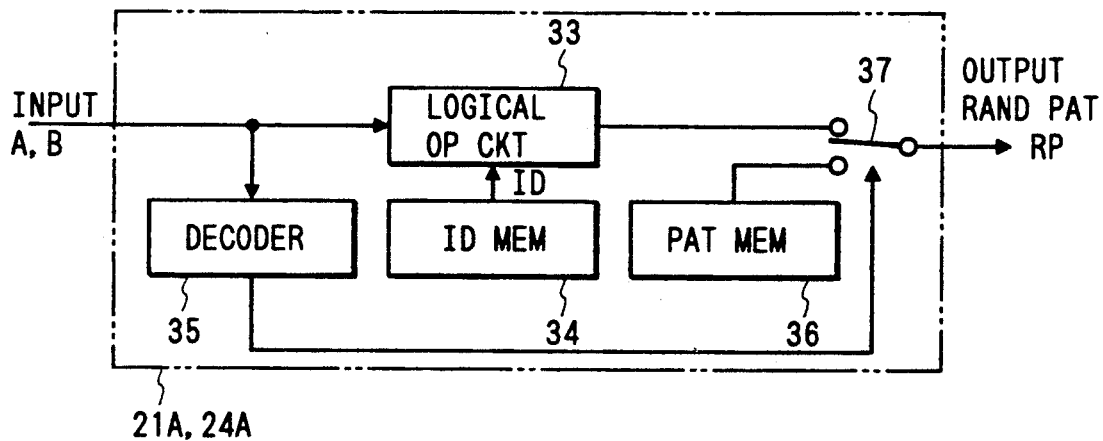
FIG. 8
FIG. 11
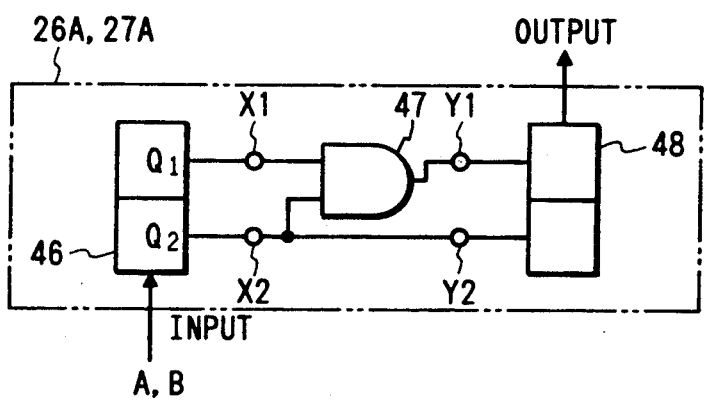
FIG. 12
TABLE II
| INPUT | | OUTPUT | |
|---|---|---|---|
| X1 | X2 | Y1 | Y2 |
| 0 | 0 | 0 | 0 |
| 0 | 1 | 0 | 1 |
| 1 | 0 | 0 | 0 |
| 1 | 1 | 1 | 1 |

SECURE COMMUNICATION EQUIPMENT AND SECURE TRANSMISSION SYSTEM

BACKGROUND OF THE INVENTION

The present invention relates to a secure transmission system in which a plurality of pieces of secure communication equipment perform secure communication between them over a transmission line. The invention also pertains to such secure communication equipment.

In a conventional transmission system for secure communication pieces of secure communication equipment 100A and 100B connected to a transmission line 10L, as shown in FIG. 1, each transmit information in an encrypted form to the other and decode an encrypted signal received therefrom to obtain information. For example, in the secure communication equipment 100A, an information signal A to be transmitted is encrypted by a scrambling circuit 11A and is then provided onto the transmission line 10L from a transmitting circuit 12A. The scrambling circuit 11A encrypts the information signal A, using a fixed random pattern K1 (an encrypting key) which is available from a pseudo random pattern generator 15A. The encrypted signal A' is transmitted by the transmitting circuit 12A to the communication equipment 100B over the transmission line 10L. On the other hand, a signal B' received by a receiving circuit 13A from the communication equipment 100B through the transmission line 10L is decoded by a descrambling circuit 14A using a fixed random pattern K2 (decoding key) available from a pseudo random pattern generator 16A, whereby an information signal B from the communication equipment 100B is obtained.

With such a conventional secure transmission system as shown in FIG. 1, the use of very long random patterns as those K1 and K2 for encryption and the complication of conversions, intended for enhanced security of data on the transmission line, will enlarge the circuit scales of the scrambling circuits 11A, 11B and the descrambling circuits 14A, 14B and will raise the cost of the entire system. In addition, since the random patterns K1 and K2 are fixed, it is difficult to completely preclude the possibility of transmitted information being decoded by a third party. For instance, in the case where pieces of secure communication equipment of the same construction as described above are connected to the transmission line 10L in addition to the pieces of communication equipment 100A and 100B, security of the transmission of information between them will degrade, if their scrambling and descrambling circuits are formed by circuits of the same specifications and the same conversion rules and conversion periods are employed.

SUMMARY OF THE INVENTION

It is therefore an object of the present invention to provide secure communication equipment which is simple in construction but provides for enhanced security in the transmission of information.

Another object of the present invention is to provide a secure communication system which is simple in construction but ensures great security of the transmission of information.

The secure communication equipment of the present invention includes: converting means for generating an encrypted signal by performing a logical conversion of a signal to be transmitted, through use of a signal received from the called party; transmitting circuit means for providing the encrypted signal onto a transmission line; information storage means for storing, as key information, a signal corresponding to the transmitted signal; receiving circuit means for receiving an encrypted signal transmitted over the transmission line; and inverse conversion means for outputting a signal obtained by decoding the received encrypted signal through its inverse logical conversion by use of the key information read out of the information storage means.

The secure transmission system according to the present invention has at least first and second pieces of communication equipment interconnected via a transmission line. The first communication equipment includes: first receiving circuit means for receiving a signal from the second communication equipment; converting means for generating an encrypted signal by performing a logical conversion of a signal to be transmitted, through use of the received signal; and first transmitting circuit means for providing the encrypted signal onto the transmission line. The second communication equipment includes: information storage means for storing, as key information, a signal to be transmitted; second transmitting circuit means for providing the signal to be transmitted onto the transmission line; second receiving circuit means for receiving an encrypted signal transmitted over the transmission line; and inverse conversion means for outputting a signal obtained by decoding the received encrypted signal through its inverse logical conversion by use of the key information read out of the information storage means.

According to the secure communication equipment and the secure transmission system of the present invention, transmission signals are encrypted using successively changing received signals from the called party, and consequently, it is very difficult for an outsider to decode the encrypted transmission signals. Moreover, the encryption of transmission signals through utilization of received signals permits implementation of high security even by a relatively simple logical conversion. Accordingly, the communication equipment can be manufactured relatively small in scale and at a low cost.

BRIEF DESCRIPTION OF THE DRAWINGS

FIG. 6 is a block diagram showing an embodiment of a random pattern generator;

FIG. 8 is a block diagram showing another embodiment of the random pattern generator;

FIG. 11 is a block diagram showing an embodiment of a pattern degenerating circuit in FIG. 10;

FIG. 12 is a table showing the relationship between the input to and the output from the pattern degenerating circuit in FIG. 10;

DESCRIPTION OF THE PREFERRED EMBODIMENTS

Figure 2:
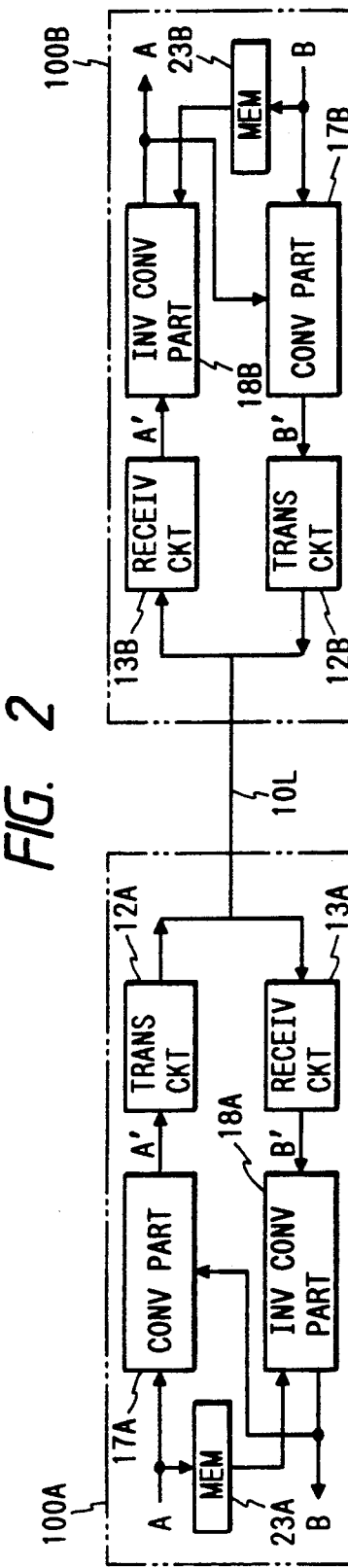
FIG. 2 is a block diagram illustrating an embodiment of the secure transmission system according to the present invention.

FIG. 2 illustrates in block form an embodiment of the secure transmission system in which the two pieces of secure communication equipment 100A and 100B embodying the present invention are connected to the transmission line 10L. Three or more pieces of secure communication equipment may also be connected to the transmission line, and since they are identical in construction, the communication equipment 100A will hereinafter be described.

The secure communication equipment 100A is made up of a transmitting circuit 12A, a receiving circuit 13A, a conversion part 17A, an inverse conversion part 18A and a transmitting information memory 23A. The conversion part 17A may be an exclusive OR circuit which obtains the exclusive OR of a received information signal B and a transmission information signal A, or a similar simple logical circuit. The same is true of the inverse conversion part 18A. The transmission information signal A of a predetermined length is applied to the conversion part 17A, wherein it is encrypted by logical conversion through utilization of the latest decoded information signal B. At the same time, the information signal A is provided as key information to the information memory 23A and is stored therein until decoding of an encrypted information signal B' received next. The thus encrypted signal A' is transmitted by the transmitting circuit 12A to the other secure communication equipment 100B over the transmission line 10L.

Following this, a received encrypted signal B' supplied via the transmission line 10L from the secure communication equipment 100B to the receiving circuit 13A is provided to the inverse conversion part 18A, wherein it is decoded into the information signal B by the key information signal A read out of the information memory 23A. On the other hand, the information signal A to be transmitted next is applied as new key information to the information memory 23A, wherein its content is rewritten, and at the same time, the information signal A is also applied to the conversion part 17A. The signal A' thus encrypted using the information signal B can be decoded in the secure communication equipment 100B, using a key information signal B stored in an information memory 23B, and the signal B' encrypted using the decoded information signal A in the secure communication equipment 100B can be decoded in the secure communication equipment 100A through utilization of the information signal A stored in the information memory 23A. Since the information signals A and B are ever-changing, however, it is hard to decode the encrypted signals A' and B' in communication equipment where neither of the information signals A and B are available.

A description will be given, with reference to Table 1 shown in FIG. 3, of an example of the operation of FIG. 2 embodiment. In this instance, let it be assumed, for the brevity' sake, that the information signals A and B are eight bits long and that the conversion parts 17A, 17B and 18A, 18B are all formed by exclusive OR circuits. Furthermore, assume that the contents of the information memories 23A and 23B in their initial state are all zeros and that the initial value $B_0$ of the output B from the inverse conversion part 18A is all zeros. Suppose that the secure communication equipment 100A transmits information signals $A_1, A_2, \ldots$ in a sequential order and the secure communication equipment 100B information signals $B_1, B_2, \ldots$ in a sequential order.

In the secure communication equipment 100A the information signal $A_1$:10101010 is stored as key information in the memory 23A and, at the same time, it is provided to the conversion part 17A, wherein the exclusive OR of the information signal $A_1$ and the initial value of the received information signal $B_0$:00000000, i.e. $A_1 \oplus B_0 = A_1'$, is calculated on a bitwise basis, and the result of exclusive OR, $A_1'$:10101010, thus obtained is transmitted to the other secure communication equipment 100B. In the communication equipment 100B the exclusive OR of the initial value $B_0$: 00000000 of the key information stored in the memory 23B and the received signal $A_1'$, i.e. $A_1' \oplus B_0 = A_1$, is calculated by the inverse conversion part 18B on a bitwise basis to obtain the received information signal $A_1$:10101010. Further, the information signal to be transmitted, $B_1$:00001111, is written as new key information into the memory 23B and, at the same time, it is applied to the conversion part 17B, wherein its exclusive OR with the received information signal $A_1$, i.e. $A_1 \oplus B_1 = B_1'$, is calculated bit by bit, and the thus obtained signal $B_1'$:10100101 is transmitted to the secure communication equipment 100A. In the communication equipment 100A the exclusive OR of the received signal $B_1'$ and the key information $A_1$ stored in the memory 23A, i.e. $A_1 \oplus B_1 = B_1$, is calculated by the inverse conversion part 18A to obtain the signal $B_1$:00001111. After this, the memory 23A is rewritten with the information signal to be transmitted next, $A_2$:110011, and its exclusive OR with the signal $B_1$, i.e. $A_2 \oplus B_1 = A_2'$, is calculated in the conversion part 17A, then the signal $A_2'$:00111100 is transmitted to the secure communication equipment 100B. In the communication equipment 100B the exclusive OR of the key information $B_1$ stored in the memory 23B and the received signal $A_2'$, i.e. $A_2' \oplus B_1 = A_2$, is calculated in the inverse conversion part 18B to obtain the information signal $A_2$:00110011. Then, the memory 23B is updated to the information to be transmitted next, $B_2$:11100011, and at the same time, its exclusive OR with the received signal $A_2$, i.e. $A_2 \oplus B_2 = B_2'$, is calculated in the conversion part 17B, and the signal $B_2'$:11010001 is transmitted to the secure communication equipment 100A. In the communication equipment 100A the key information $A_2$ stored in the memory 23A and the received signal $B_2'$ are used to calculate $A_2 \oplus B_2' = B_2$ in the inverse conversion part 18A, and thereafter procedures similar to those mentioned above are repeated.

Incidentally, in the case where the conversion part 17A is formed by a simple exclusive OR circuit as in the above example, if the initial value $B_0$ of the received information signal B is all zeros at the start of communication as mentioned above with respect to FIG. 3, the first transmission information signal $A_1$, even after being converted to $A_1'$ by the exclusive OR circuit, remains unchanged, i.e. $A_1' = A_1$, furnishing an outside with a key for decoding. Similarly, when the transmission information signal A happens to be all zeros during communication, the information signal B received at that time will be output intact from the conversion part 17A, furnishing the outside with the key for decoding.

Figure 1:
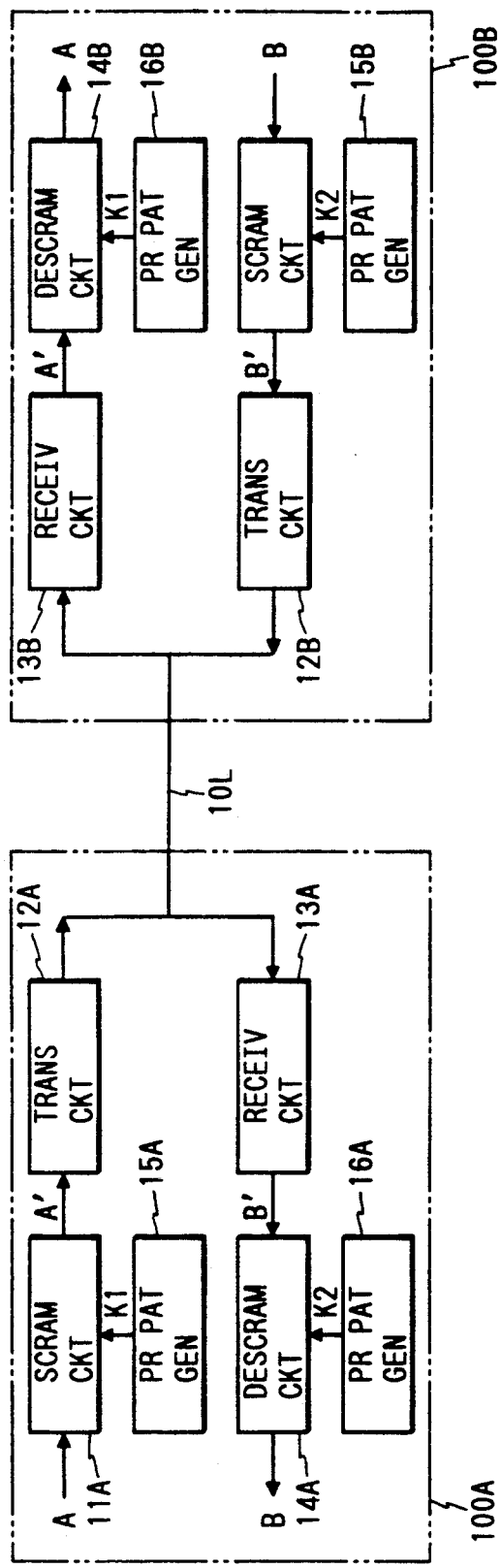
FIG. 1 is a block diagram illustrating an example of a conventional secure transmission system.

The same is true of the case where the information signal A and/or B is all zeros and/or all ones. To avoid such an outflow of original information, it is possible to employ an arrangement shown in FIG. 4, wherein the transmission information A is subjected to the logical conversion in the scrambling circuit 11A by a fixed random pattern K1 from the pseudo random pattern generator 15A as in the case of FIG. 1 and is then subjected to processing for transmission similar to that in FIG. 2 and the received information signal output from the inverse conversion part 18A is subjected to inverse logical conversion in the descrambling circuit 14A by a fixed random pattern K2 from the pseudo random pattern generator 16A. The scrambling circuit 11A and the descrambling circuit 14A may be formed by exclusive OR circuits or some other logical circuits, for example.

The scrambling circuit 11A is intended primarily for randomizing the transmission information signal A, not for encryption. Accordingly, if the initial value of the key information is set to a predetermined value except all zeros and all ones and if there is guarantee that the transmission information signal A will not be a sequence of zeros or ones, no scrambling is needed. Conversely, security can be enhanced by scrambling. Moreover, by using different patterns of the same length as the scrambling patterns (the pseudo random patterns) which are used by the communication equipment 100A and the other side communication equipment 100B (not shown in FIG. 4), security improves accordingly; further, by making the lengths (the numbers of bits) of the patterns different, security will be further enhanced. Besides, in the above embodiment it is necessary to employ what is called an external synchronization system for establishing synchronization between, for example, the phase of the pseudo random pattern K1 for the information signal A in the scrambling circuit 11A of the secure communication equipment 100A and the phase of the pseudo random pattern K1 for the received encrypted signal A' in the descrambling circuit 14B of the secure communication equipment 100B. It is also possible, however, to employ a known self-synchronization type scrambling circuit in which an information signal input for each bit is applied to, for example, the one input terminal of an exclusive OR circuit, the output of the exclusive OR circuit is fed back to the other input thereof via a predetermined number of stages of shift registers and the output of the exclusive OR circuit is used as the output of the scrambling circuit. A self-synchronization type descrambling circuit for use with such a self-synchronization type scrambling circuit is also well-known.

Figures 3, 4:
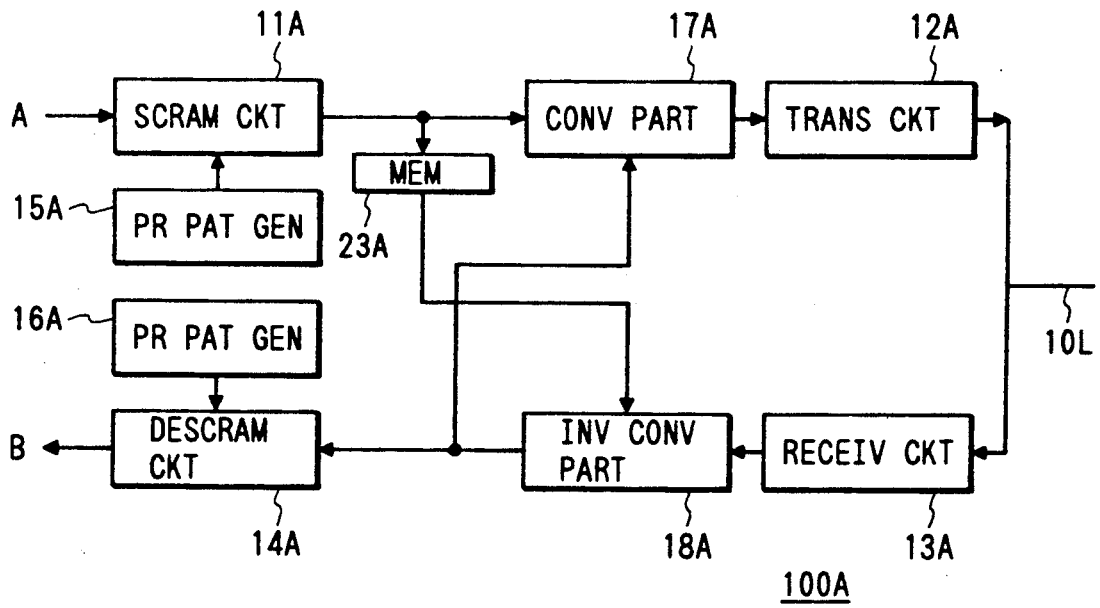
FIG. 3 is a table showing changes of signals, for explaining the operation of the FIG. 2 embodiment.
FIG. 4 is a block diagram illustrating an embodiment of secure communication equipment for use in the transmission system according to the present invention.
Figure 5:
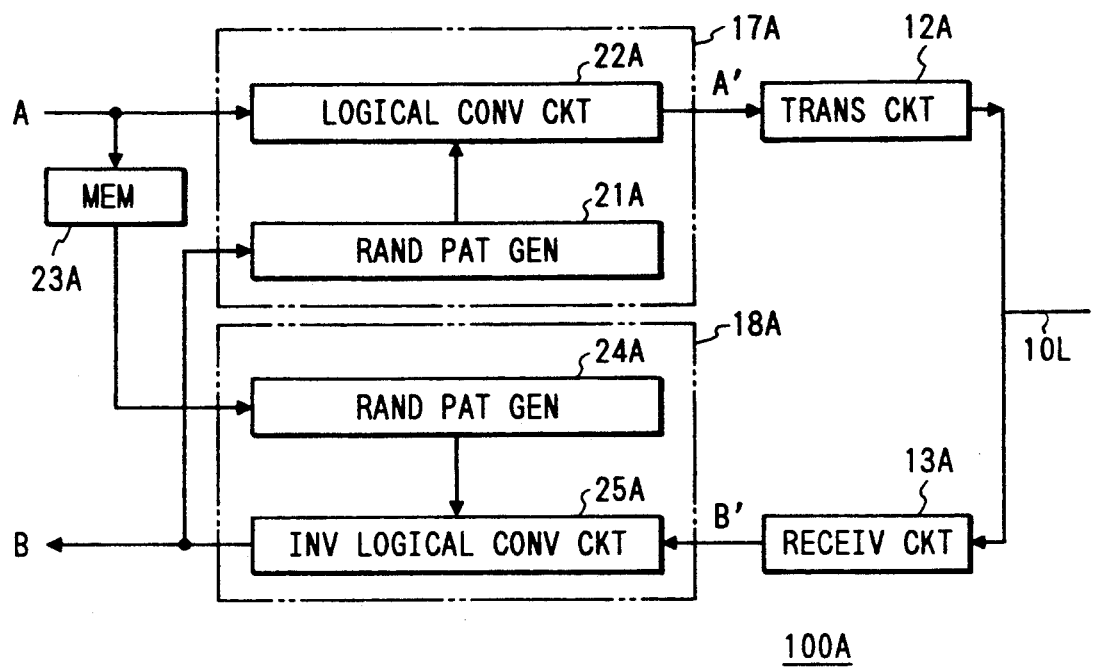
FIG. 5 is a block diagram illustrating another embodiment of the secure communication equipment.

In the embodiments of FIGS. 2 and 4 the conversion part 17A may also be formed by a random pattern generator and a logical conversion circuit so as to further enhance the security. FIG. 5 shows an example of the secure communication equipment 100A in such an instance. A random pattern generator 21A of the conversion part 17A creates and outputs a random pattern corresponding to all or a predetermined number of bits of the decoded information signal B. A logical conversion circuit 22A may be an exclusive OR circuit or similar logical circuit as mentioned above. The inverse conversion part 18A may also be formed by a random pattern generator 24A and an inverse logical conversion circuit 25A. By such an arrangement for avoiding direct conversion of the transmission information signal A by the decoded information signal B, it is possible to maintain a high degree of security, even if the information signals A and/or B happen to be all zeros or all ones at the start of or during communication, for example. In addition, since the information signals A and B are successively changing, the random patterns produced also vary with time, achieving a high degree of security.

The random pattern generator 24A of the inverse conversion part 18A need not always be exactly identical in construction with the random pattern generator 21A of the conversion part 17A. The same is true of the secure communication equipment 100B, but it is necessary that random pattern generators of the conversion part 17B and the inverse conversion part 18B (not shown) be exactly identical in construction with the random pattern generators 24A and 21A of the inverse conversion part 18A and the conversion part 17A, respectively.

Figure 7:
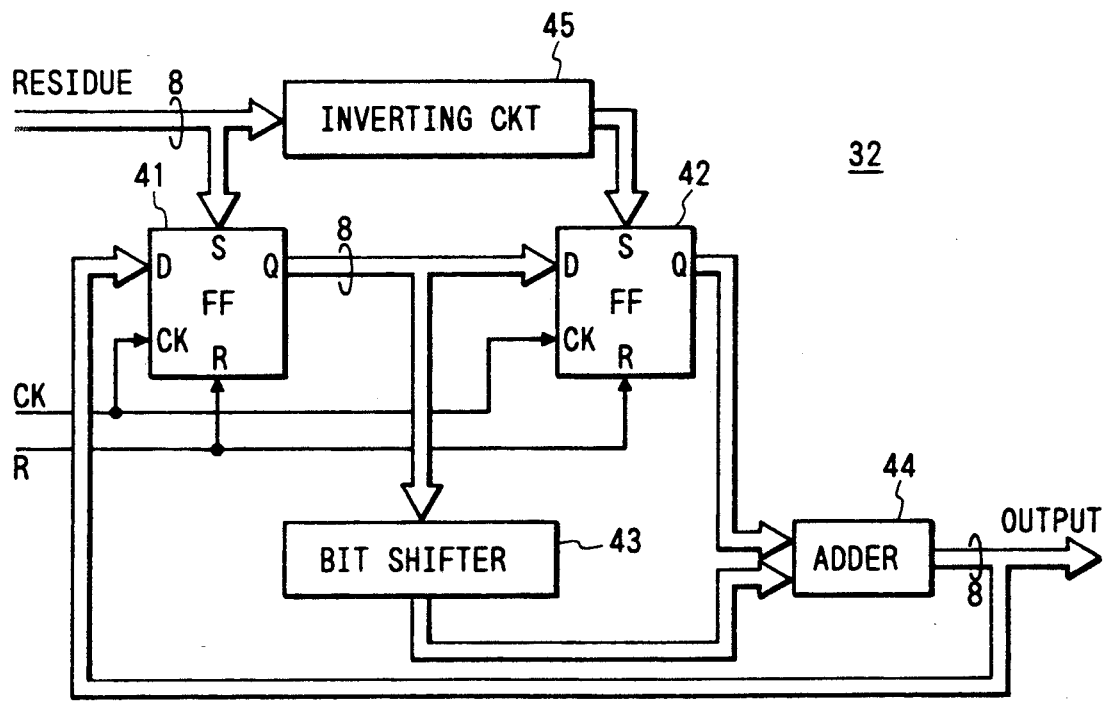
FIG. 7 is a block diagram showing an embodiment of a non-linear operation circuit in FIG. 6.

FIG. 6 illustrates an embodiment of the random pattern generators 21A and 24A in FIG. 5 (and those of the conversion part 17A and the inverse conversion part 18B), which is made up of a division circuit 31 and a non-linear operation circuit 32. The division circuit 31 divides the information signal A or B or one part thereof by a predetermined polynomial and provides the residue (see W.W. Peterson and E.J. Weldon, "Error-correcting codes," M.I.T. Press, 1972, for example) to the non-linear operation circuit 32. The non-linear operation circuit 32 performs an irreversible calculation which is hard to estimate the input from the output thereof, and the calculated output is provided as a random pattern. FIG. 7 shows an example of such a non-linear operation circuit 32 which is formed by a recursive filter.

The non-linear operation circuit 32 has its initial value set corresponding to the residue provided from the division circuit 31 and generates a random pattern from the initial value. As shown, the non-linear operation circuit 32 is made up of, for example, 8-bit D type flip-flop circuits 41 and 42 forming two stages of parallel 8-bit shift registers (i.e. two stages of delay circuits), a bit shifter 43 and an eight-bit adder 44. The 8-bit initial values which are set in the 8-bit D type flip-flop circuits 41 and 42, respectively, may be the same data of predetermined eight bits of the residue provided from the division circuit 31, but in the embodiment of FIG. 7 the 8-bit data is set in the flip-flop circuit 41 and the logic of all the eight bits of the 8-bit data is inverted by a logical inverting circuit 45, then the inverted output is set in the flip-flop circuit 42. The 8-bit data set in the flip-flop circuit 41 is provided to the bit shifter 43, wherein all of its bits are shifted, for instance, in the direction of the least significant bit a predetermined number of bits, for example, one bit (that is, the 8-bit data is divided by 2) and the underflow is discarded, and at the same time, the resultant 8-bit output is applied to one input of the 8-bit adder 44. The adder 44 is supplied at the other input with the contents of the eight bits set in the flip-flop circuit 42. The overflow resulting from the addition is discarded and the 8-bit added output is provided as a partial pattern in a random pattern sequence and, at the same time, it is applied to a data terminal D (8-bit) of the flip-flop circuit 41. When a clock signal CK is applied to clock terminals CK of the flip-flop circuits 41 and 42 in the above state, the 8-bit Q output of the flip-flop 41 is fetched into the flip-flop circuit 42, and at the same time, data provided to the data terminal D of the flip-flop circuit 41 is fetched thereinto, in consequence of which the next partial pattern (8-bit) is output from the adder 44. The clock signal CK is applied to the flip-flop circuits 41 and 42 every eight bits of the information signal A (or B). For example, if the information signal A (or B) is 128 bytes long, then the flip-flop circuits 41 and 42 are reset by a reset signal R after applying thereto the clock signal CK 128 times, and based on the next information signal A (or B), a new initial value is preset again in the flip-flop circuits 41 and 42; thereafter the above-described operation is repeated. Incidentally, the bit shifter 43 may also shift the input 8-bit data in the direction of the most significant bit, a predetermined number of bits (i.e. multiplied by a power of 2) and discard the overflow. Thus, the irreversibility of calculation can be achieved by discarding the overflow of the adder 44 or the underflow (or overflow) of the divider (or multiplier) 43 as mentioned above.

With the random pattern generator 21A in FIG. 6, which is composed of a simple division circuit 31 and a secondary recursive filter 32 as referred to above, a random pattern is produced as a sequence of partial patterns which are uniquely determined in accordance with the input information signal A (or B), and it is very difficult to estimate the information signal A (or B) from such a series of partial patterns. It is evident that the security could be further enhanced by raising the order of the recursive filter 32.

FIG. 8 illustrates another embodiment of the random pattern generator 21A or 24A (a similar circuit also being provided in the communication equipment 100B), which is comprised of a logical operation circuit 33, an identification number memory 34, a decoder 35, a fixed pattern memory 36 and a change-over switch 37. The identification number memory 34 has stored therein an identification number ID assigned to the secure communication equipment concerned. The logical operation circuit 33 performs a logical calculation or operation of the applied information signal A (or B) and the identification number ID from the identification memory 34 or its predetermined part and outputs the result of the operation as a random pattern RP via the change-over switch 37. When having detected that the input information signal A (or B) is all zeros or all ones, the decoder 35 outputs a control signal, by which the change-over switch 37 is connected to the fixed pattern memory 36 to output therefrom a predetermined fixed pattern other than one that is all zeros and all ones. With such an arrangement, it is possible to prevent the identification number ID for the equipment stored in the identification number memory 34 from being provided intact to the conversion circuit 22A or inverse conversion circuit 25A when the information signal A (or B) applied to the random pattern generator 21A (or 24A) is all zeros or all ones. Incidentally, the change-over switch 37 need not always be provided at the output of the logical operation circuit 33 but may also be provided at the output side of the logical conversion circuit 22A (the inverse logical conversion circuit 25A).

Figure 9:
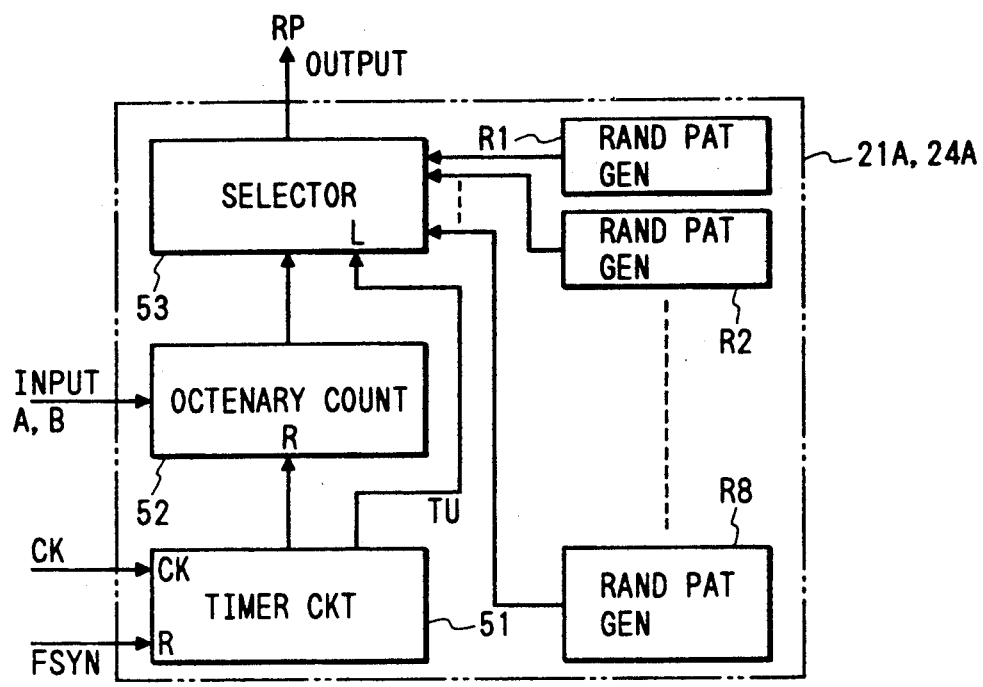
FIG. 9 is a block diagram showing still another embodiment of the random pattern generator.

FIG. 9 illustrates still another embodiment of the random pattern generator 21A or 24A. This embodiment selectively outputs one of a plurality of, for instance, eight different random patterns in accordance with the input information signal A (or B), and this circuit has such a construction as described below. A timer circuit 51 is supplied with the clock signal CK regenerated by the receiving circuit 13A and a frame synchronizing signal FSYN and is reset by the latter and counts the former and, when the count value has reached a predetermined value, it applies a time-up signal TU to a load terminal L of a selector 53. The frame synchronizing signal FSYN is also applied to a reset terminal R of an octernary counter 52 via the timer circuit 51. The octernary counter 52 is supplied with the information signal A (or B) and sequentially counts "1's" (or "0's") in a sequence of its bits. When supplied at its load terminal L with the time-up signal TU from the timer circuit 51, the selector 53 fetches therein the count value of the octernary counter 52, selects one of eight random pattern generators R1 through R8 in accordance with the count value and outputs a random pattern RP generated by the selected random pattern generator. The random pattern generators R1 through R8 may be well-known pseudo random pattern generators each formed by, for instance, a shift register and exclusive OR circuits, or they may also be constituted by a ROM having stored therein a required number (eight in this example) of random patterns or software of a programmed random pattern generating procedure.

Figure 10:
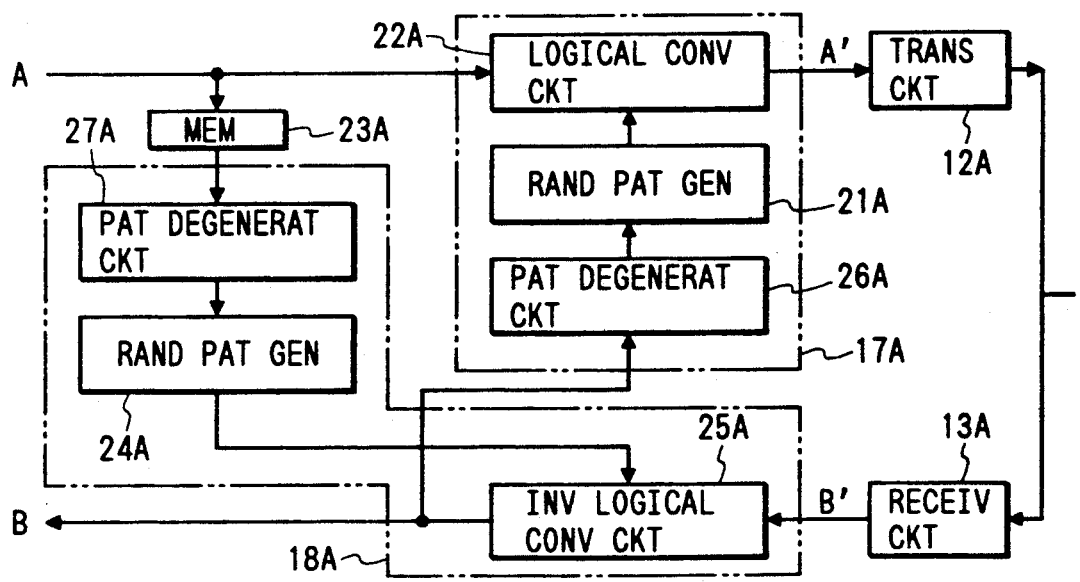
FIG. 10 is a block diagram illustrating another embodiment of the secure communication equipment.

FIG. 10 illustrates another embodiment of the secure communication equipment 100A which employs such random pattern generators as exemplified above and is constructed with a view to making it more difficult to decode the input information signal from the generated random pattern. This embodiment differs from the secure communication equipment of FIG. 2 in that pattern degenerating circuits 26A and 27A are provided at the input sides of the random pattern generators 21A and 24A in the conversion part 17A and the inverse conversion part 18A, respectively. The pattern degenerating circuits 26A and 27A are each supplied with $2^n$ possible different patterns (n-bit) and allot a predetermined one of M different patterns smaller in number than $2^n$ to each of the input patterns, and consequently, the same output pattern is produced for a plurality of different input patterns. For instance, if the pattern degenerating circuit 26A outputs the same pattern for each of received information signals B of two predetermined different patterns, the random pattern generator 21A also outputs the same random pattern. It is impossible to judge, from the random pattern output from the random pattern generator 21A, which of the two patterns the received information signal B corresponds to. In the embodiment of FIG. 10 the random pattern generator 21A and the pattern degenerating circuit 26A may also be exchanged in position, and similarly, the random pattern generator 24A and the pattern degenerating circuit 27A may also be exchanged in position.

FIG. 11 illustrates an embodiment of the pattern degenerating circuit 26A (or 27A) used in the embodiment of FIG. 10. The illustrated example comprises a two-stage shift register 46, an AND circuit 47 and another two-stage shift register 48. Upon each serial loading of two bits of the information signal A or B into the shift register 46, outputs Q1 and Q2 of its two stages are provided via input terminals X1 and X2 to input terminals of the AND circuit 47 and their logical product is provided to an output terminal Y1. On the other hand, the output Q2 is provided via the input terminal X2 to an output terminal Y2 as well. The outputs thus provided to the output terminals Y1 and Y2 are input in parallel into the two stages of the shift register 48 and are output therefrom in serial, and at the same time, the next two bits of the information signal A (or B) are input in serial into the shift register 47 and the operation described above is repeated. As a result of this, the 2-bit pattern provided to the input terminals X1 and X2 and the 2-bit pattern available at the output terminals Y1 and Y2 bear such relationships as shown in Table II of FIG. 12. When the input bit pattern is either "00" or "10," the output bit pattern goes to "00." Consequently, the probability that the input pattern can be estimated from the output pattern of the pattern degenerating circuit decreases accordingly.

Figure 13:
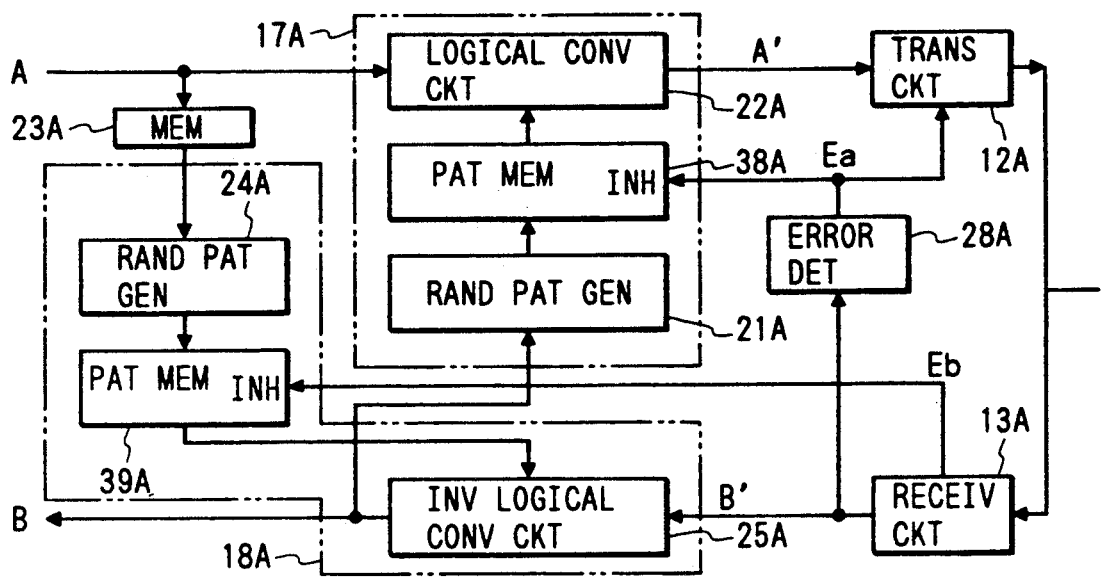
FIG. 13 is a block diagram illustrating a further embodiment of the secure communication equipment of the present invention.

FIG. 13 illustrates another embodiment of each secure communication equipment in the FIG. 2 embodiment. The following description will be given of the equipment 100A. In this embodiment there is provided an error detector 28A for detecting a code error in the received encrypted signal B' output from the receiving circuit 13A. Further, random patterns created by the random pattern generators 21A and 24A are fetched into pattern memories 38A and 39A, from which they are provided to the conversion circuit 22A and the inverse conversion circuit 25A. The error detector 28A utilizes, for example, a well-known CRC (cyclic redundancy check) error detecting method and, upon detecting a code error in the received encrypted signal B', it applies a detection signal Ea to an inhibit terminal INH of the pattern memory 38A and the transmitting circuit 12A. The pattern memory 38A is inhibited by the detection signal Ea from fetching the random pattern from the random pattern generator 21A, and consequently, the random pattern held until then is not updated and is supplied again to the logical conversion circuit 22A. The logical conversion circuit 22A uses the random pattern to encrypt the information signal A and the transmitting circuit 12A appends the error detection signal Ea to the head of the encrypted information signal A' and then provides the signal onto the transmission line 10L. As long as the error detector 28A outputs the error detection signal Ea (one bit), this operation is repeated, and when the error detector 28A stops outputting the error detection signal Ea, the pattern memory 38A resumes fetching of the random pattern from the random pattern generator 21A. On the other hand, when the communication equipment 100B of the called party has detected a code error in the received encrypted signal A', the same operation as described above is performed, and as a result, the encrypted information signal B' appended with an error detection signal Eb is transmitted to the communication equipment 100A. Having detected the error detection signal Eb appended to the received encrypted signal B', the receiving circuit 13A of the communication equipment 100A inhibits, by the signal Eb, the random pattern fetching operation of the pattern memory 38A of the inverse conversion part 18A. Hence, the received encrypted signal B' is decoded by the inverse logical conversion circuit 25A through use of the random pattern held in the pattern memory 39A until then.

In the event that a code error has thus been detected in the received signal B', the random pattern that is produced by the random pattern generator 21A, based on the received information signal B containing the error, is not used but a random pattern created immediately before is used to encrypt the information signal A and the error detection signal Ea is transmitted to the called communication equipment 100B, so that correct decoding and encrypting processing can be continued. To avoid the influence of a code error in the error detection signals Ea and Eb on the transmission line, it is also possible to transmit them a plurality of times and judge an error signal by majority at the receiving side.

Figure 14:
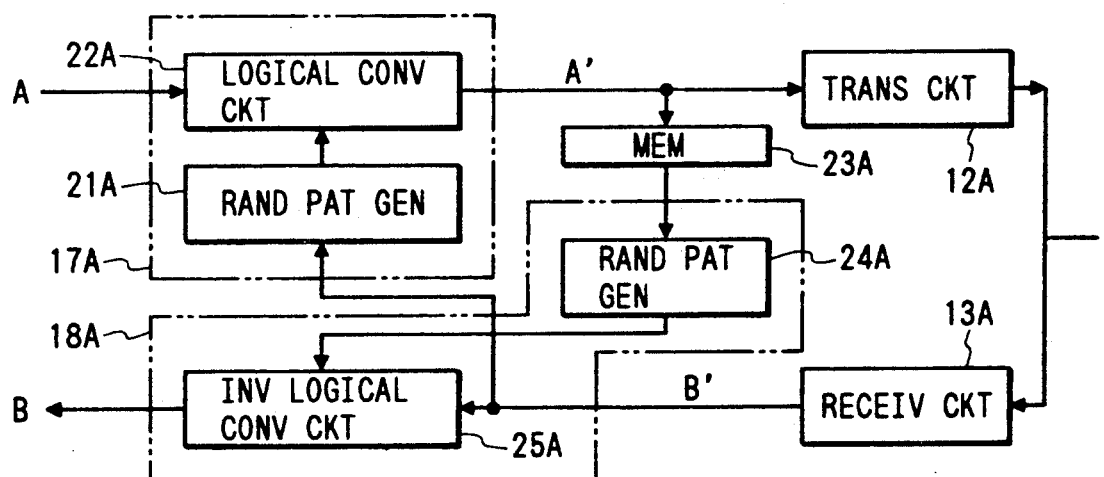
FIG. 14 is a block diagram illustrating a still further embodiment of the secure communication equipment according to the present invention.

Although the embodiments of FIGS. 5, 10 and 13 have been described in connection with the case where the random pattern for encrypting the information signal A is created by the random pattern generator 21A through utilization of the decoded information signal B and the random pattern for decoding the received encrypted signal B' is produced by the random pattern generator 24A through utilization of the information signal A prior to its encryption, it is also possible to produce the random pattern for encrypting the information signal A through utilization of the received signal B' prior to its decoding and produce the random pattern for decoding the received signal B' through utilization of the encrypted information signal A'. FIG. 14 illustrates, corresponding to FIG. 5, an example of the secure communication equipment 100A in such a case. The principles of operation of the communication equipment 100A is the same as in the case of FIG. 5, and hence further the description will be omitted.

Figure 15:
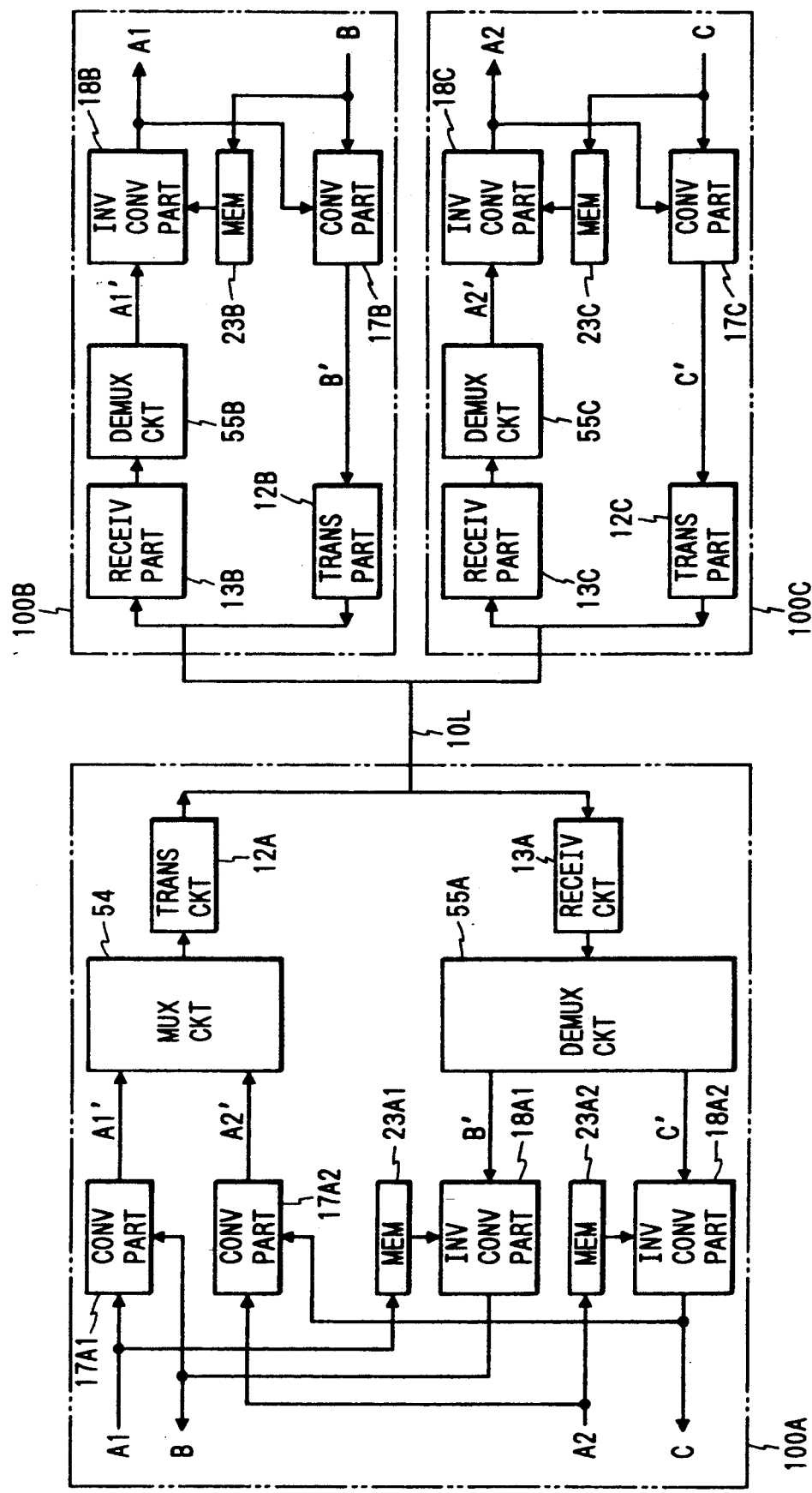
FIG. 15 is a block diagram illustrating a further embodiment of the secure transmission system according to the present invention.

While the secure communication equipment and the secure transmission system according to the present invention have been described in respect of one-to-one secure communication, it is evident that the invention is not limited specifically thereto but may also be applied to a point to multipoint transmission system. An example is shown in FIG. 15. In this transmission system the communication equipment 100A performs multiplex communication with plural, for example, two pieces of communication equipment 100B and 100C via the transmission line 10L. The multiplex method may be time division multiplex, frequency multiplex, or a similar multiplex method. The communication equipment 100A will hereinafter be referred to as center equipment and the pieces of communication equipment 100B and 100C as subscriber equipment. The center equipment 100A encrypts information signals $A_1$ and $A_2$ to be transmitted to the pieces of subscriber equipment 100B and 100C by conversion parts $17A_1$ and $17A_2$ through use of pieces of decoded information B and C available from the pieces of subscriber equipment 100B and 100C. At this time, the information signals $A_1$ and $A_2$ are held as key information in information memories 23A1 and 23A2 as in the afore-mentioned embodiments. The encrypted information signals A1' and A2' are multiplexed by a multiplexing circuit 54, thereafter being provided onto the transmission line 10L by the transmitting circuit 12A.

The subscriber equipment 100B separates, by a demultiplexing circuit 55B, the encrypted information signal A1' destined for the equipment 100B from the multiplexed signal received by the receiving circuit 13B from the center equipment 100A and then decodes the information signal A1' in the inverse conversion part 18B by use of the key information stored in the information memory 23B, that is, the information signal B transmitted immediately before, thus obtaining the information signal A1. Moreover, the subscriber equipment 100B stores the information signal B to be transmitted next in an information memory 23B, encrypts the signal B in the conversion part 17B through use of the decoded information signal A1 and provides the encrypted information signal B' onto the transmission line 10L from the transmitting circuit 12B. In the case where this transmission system uses a synchronized time division multiplex system such as a time division multiple access system, however, the signal B' is provided onto the transmission line 10L in a time slot assigned to the subscriber equipment 100B; when an asynchronous time division multiplex system is employed, a packet appended with an address is utilized; and when a frequency multiplex system is employed, a frequency assigned to the equipment 100B is used. The subscriber equipment 100C also performs the same operation as mentioned above, whereby it obtains the decoded information signal $A_2$ and transmits an information signal C. The center equipment 100A separates, by a demultiplexing circuit 55A, the multiplexed signal received by the receiving circuit 13A to obtain the encrypted information signals B' and C' from the pieces of subscriber equipment 100B and 100C and decodes them in inverse conversion parts 18A1 and 18A2 by use of the pieces of key information A1 and A2 stored in the information memories 23A1 and 23A2, thus obtaining the information signals B and C.

It is needless to say that the random pattern generators depicted in FIGS. 6, 8 and 9 and various other random pattern generators are applicable to the conversion parts 17A1, 17A2, 17B, 17C and the inverse conversion parts 18A1, 18A2, 18B, 18C of the pieces of communication equipment 100A, 100B and 100C in the secure transmission system of FIG. 15. It is also possible to adopt an arrangement which employ the scrambling circuit 11A, the descrambling circuit 14A and the pseudo random pattern generators 15A and 16A in each of the pieces of communication equipment 100A, 100B and 100C as depicted in FIG. 4 and in which, at the transmitting side of each equipment, the transmission information signal is once encrypted using a fixed pseudo random pattern and is then encrypted in the conversion part on the basis of the received signal and, at the receiving side, the received signal is once decoded in the inverse conversion part and is then decoded in the descrambling circuit 14A through use of the fixed pseudo random pattern. Each communication equipment may also have such a construction as shown in FIG. 10, in which information signals are converted by the pattern degenerating circuits 26A and 27A so that their plural different partial patterns may become the same partial pattern, followed by the formation of random patterns based thereon. Also it is possible to utilize such an arrangement as described previously with respect to FIG. 13, in which the error detector 28A is provided, the random patterns generated by the random pattern generators of the conversion part and the inverse conversion part are applied to the conversion circuit and the inverse conversion circuit after being once stored in the pattern memories 38A and 39A, and when a code error has been detected in the received signal the detection signal is transmitted to the other side communication equipment and the writing of random pattern into each pattern memory is inhibited. In the secure transmission system of the present invention shown in FIG. 15, the transmission line 10L is not limited specifically to an electric signal cable but may also be a spatial radio wave propagation path or optical fiber transmission line.

Figure 16:
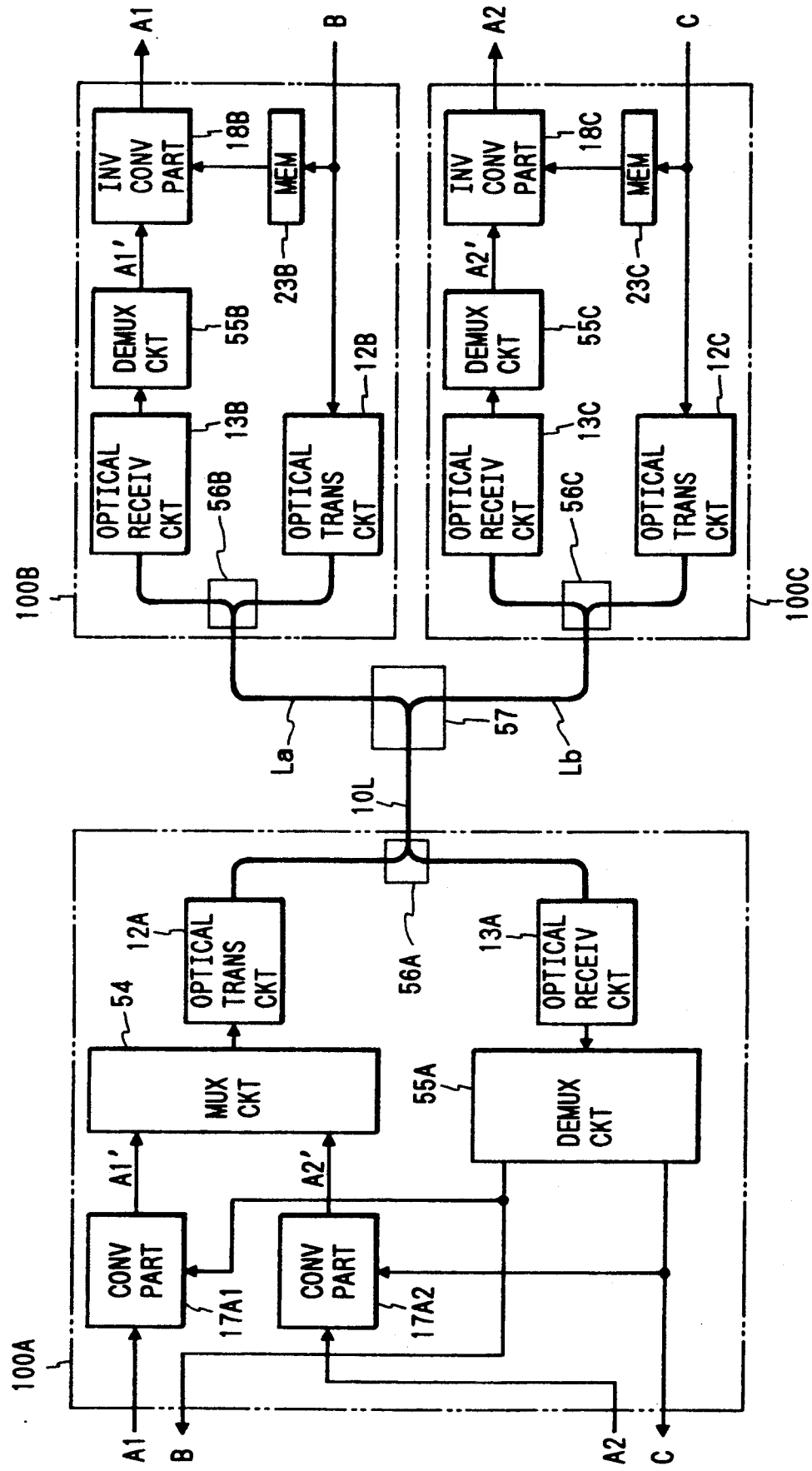
FIG. 16 is a block diagram illustrating a still further embodiment of the secure transmission system according to the present invention.

FIG. 16 illustrates another embodiment of the present invention in which an optical fiber transmission system is applied to the point to multipoint transmission system shown in FIG. 15. To the common optical fiber transmission line 10L from the center equipment 100A are connected, by an optical directional splitter 57, individual optical fiber lines La and Lb from the pieces of subscriber equipment 100B and 100C. The multiplexed signal from the center equipment 100A is transmitted to all the pieces of subscriber equipment 100B and 100C at the same time as in the case of FIG. 15. As is the case with FIG. 15, each subscriber equipment is capable of easily extracting signals transmitted to the other subscriber equipment, and consequently, it is necessary to encrypt the signals which are transmitted from the center equipment 100A to the pieces of subscriber equipment 100B and 100C. However, since each subscriber equipment is connected via the optical directional splitter 57 to the optical fiber transmission line 10L, the transmission signal from each subscriber equipment can be transmitted to only the center equipment 100C without leakage to any other pieces of subscriber equipment. For this reason, in the embodiment of FIG. 16 the transmission signals from the pieces of subscriber equipment 100B and 100C are not encrypted.

The center equipment 100A does not include the inverse conversion parts 18A1, 18A2 and the information memories 23A1, 23A2 used in the embodiment of FIG. 15. The multiplexed signal received by the optical receiving circuit 13A is separated by the demultiplexing circuit 55A into the information signals B and C from the pieces of subscriber equipment 100B and 100C, and in the conversion parts 17A1 and 17A2 the information signals A1 and A2 to be transmitted are encrypted using the information signals B and C. The encrypted information signals A1' and A2' are multiplexed by the multiplexing circuit 54 and then provided onto the optical fiber transmission line 10L via an optical coupler 56A from the optical transmitting circuit 12A. The transmission signal is branched by the optical directional splitter 57 to all the pieces of subscriber equipment 100B and 100C. The pieces of subscriber equipment 100B and 100C do not include the conversion parts 17B and 17C used in the embodiment of FIG. 15. For example, in the communication equipment 100B the encrypted signal A1' destined therefor is separated by the demultiplexing circuit 55B from the multiplexed signal received by the optical receiving circuit 13B and is then provided to the inverse conversion part 18B, wherein it is decoded into the information signal $A_1$ through utilization of the key information stored in the information memory 23B, i.e. the immediately preceding transmitted information signal B. The information signal B to be transmitted from the subscriber equipment 100B is not encrypted and is provided intact onto the optical fiber transmission line 10L from the optical transmitting circuit 12B via an optical coupler 56B and the optical directional splitter 57.

Also in the embodiment of FIG. 16, the conversion parts 17A1, 17A2 and the inverse conversion parts 18B, 18C may each be implemented by a simple exclusive OR circuit, and it is also possible, with a view to further increasing security, to form the conversion parts 17A1 and 17A2 by the random pattern generator 21A and the logical conversion circuit 22A and the inverse conversion parts 18B and 18C by the random pattern generator 24A and the inverse logical conversion circuit 25A as in the FIG. 5 embodiment. In this instance, the aforementioned various embodiments can be used as the random pattern generators. Incidentally, the center equipment 100A usually possesses a function of controlling the entire transmission system and has the polynomial or the identification number ID that each subscriber equipment uses in the random pattern generator in FIG. 6 or 8.

Moreover, as in the embodiment of FIG. 4, the center equipment 100A may also be constructed so that the information signals A1 and A2 are preencrypted by fixed patterns in scrambling circuits at the input sides of the conversion parts 17A1 and 17A2, and so that the received information signals demultiplexed by the demultiplexing circuit 55A are decoded by descrambling circuits into the information signals B and C. In this case, the pieces of subscriber equipment 100B and 100C are also provided with descrambling circuits at the output sides of the inverse conversion parts 18B and 18C and scrambling circuits at the transmission information signal input sides for encrypting the information signals B and C prior to their transmission.

The embodiment of FIG. 16 may also utilize the pattern degenerating circuits 26A and 27A described previously in respect of FIG. 10. The embodiment of FIG. 13 may also be applicable to FIG. 16. That is, the conversion parts 17A1 and 17A2 of the center equipment 100A are each formed to have the same construction as that of the conversion part 17A depicted in FIG. 13 and an error detector is connected to each output of the demultiplexing circuit 55A. The error detection outputs of the error detectors are provided as inhibit signals to pattern memories of the corresponding conversion parts and the multiplexing circuit 54, and at the time of multiplexing the encrypted information signals A1' and A2', codes (one bit) representing the error detection signals are appended to the corresponding encrypted information signals at, for example, the head thereof. In the pieces of subscriber equipment 100B and 100C the inverse conversion parts 18B, 18C have the same construction as that of the inverse conversion part 18A depicted in FIG. 13, code error detectors are connected to the outputs of the demultiplexing circuits 55B and 55C, respectively, and the detection outputs are provided as inhibit signals to pattern memories of the inverse conversion parts 18B and 18C.

Next, a description will be given of examples of a timing chart which indicates the signal transmission system between the center equipment 100A and the pieces of subscriber equipment 100B and 100C in the embodiment of FIG. 16. For the sake of clarity, the encrypted information signals will hereinafter be identified by the same reference numerals with no primes as those used in the above for denoting the unencrypted information signals. The broken-lined arrows En indicate the encryption process and the broken-lined arrows De the decoding process.

Figure 17:
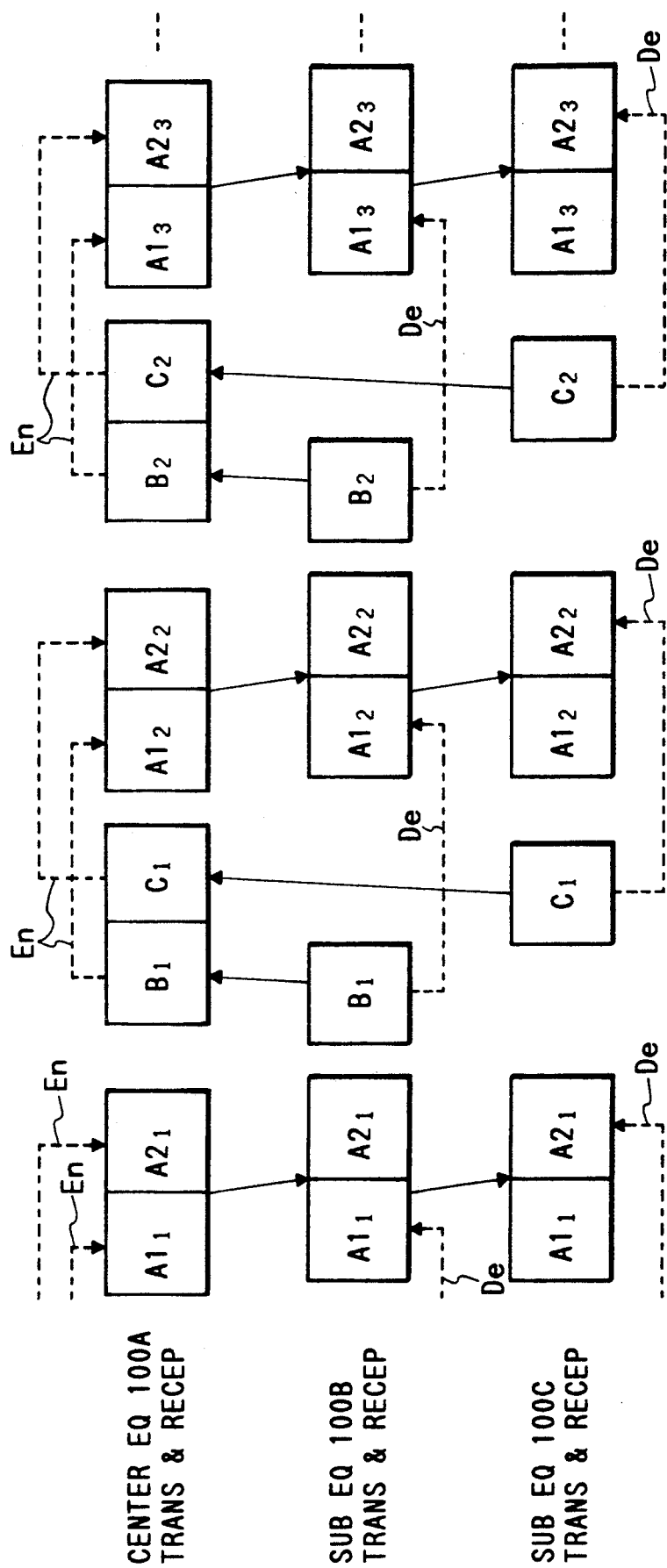
FIG. 17 is a timing chart showing an example of a synchronous time division multiplex communication in the secure transmission system of the present invention.

FIG. 17 is a timing chart showing the case where upward signals from the pieces of subscriber equipment 100B and 100C to the center equipment 100A and downward signals from the latter to the former are subjected to time division multiplexing with synchronized timing for transmission and reception as in the TDMA, and in this instance the signal transmission and reception period (i.e. the repetitive period) Tf is constant. Encrypted signals $A1_1$ and $A2_1$ (of a constant length) destined for the pieces of subscriber equipment 100B and 100C are transmitted from the center equipment 100A in time slots preassigned to them. The pieces of subscriber equipment 100B and 100C extract the encrypted signals $A1_1$ and $A2_1$ from the time slots assigned to them, respectively, decode the encrypted signals $A1_1$ and $A2_1$ using the immediately preceding transmission information (not shown) and, after a certain elapsed time Tx, send out information signals $B_1$ and $C_1$. The center equipment 100A receives the information signals $B_1$ and $C_1$, encrypts information signals $A1_2$ and $A2_2$ to be transmitted next through utilization of the received information signals $B_1$ and $C_1$ and, the certain time Tx after the previous transmission, transmits the encrypted information signals $A1_2$ and $A2_2$ in the predetermined time slots. The pieces of subscriber equipment 100B and 100C receive the encrypted information signals $A1_2$ and $A2_2$ and decode them using the previously transmitted information signals $B_1$ and $C_1$ and, after the certain elapsed time Tx, transmit information signals $B_2$ and $C_2$, respectively. Thereafter, the same operations as mentioned above are repeated.

Figure 18:
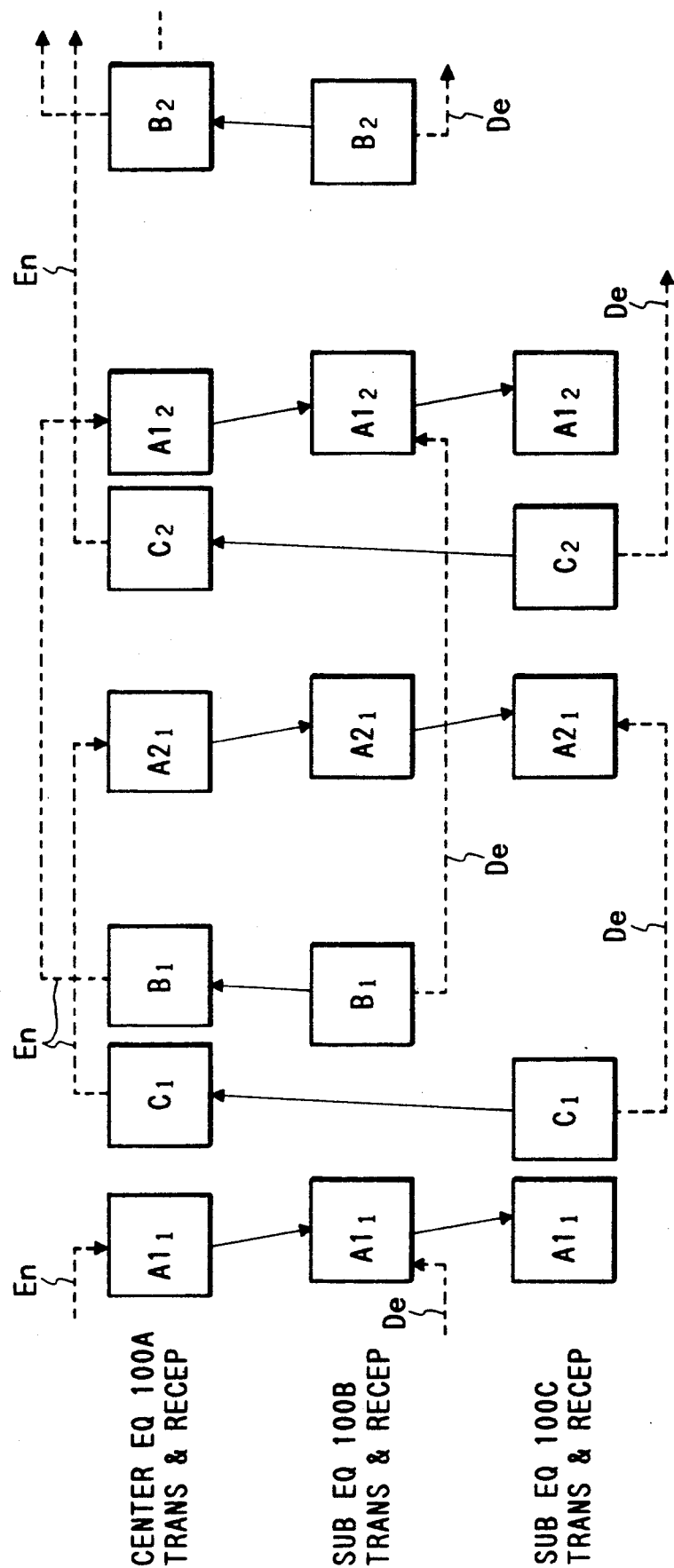
FIG. 18 is a timing chart showing an example of an asynchronous time division multiplex communication in the secure transmission system of the present invention.

FIG. 18 is a signal transmission and reception timing chart of a time division multiplex system of asynchronous signal transmission and reception timing. The center equipment 100A has a function of retaining the latest decoded received information from each subscriber equipment until at least the next decoded received signal is obtained, and the center equipment 100A transmits, as packets at arbitrary timing, to the pieces of subscriber equipment 100B and 100C encrypted information signals appended at the head with their addresses. The pieces of subscriber equipment 100B and 100C transmit, at arbitrary timing, packets having their addresses appended to the heads of the information signals B and C to be transmitted, respectively. The center equipment 100A and the pieces of subscriber equipment 100B and 100C all have a signal collision detecting function, and in the case of a signal collision being detected during transmission of a signal, the packet is transmitted again.

Figure 19:
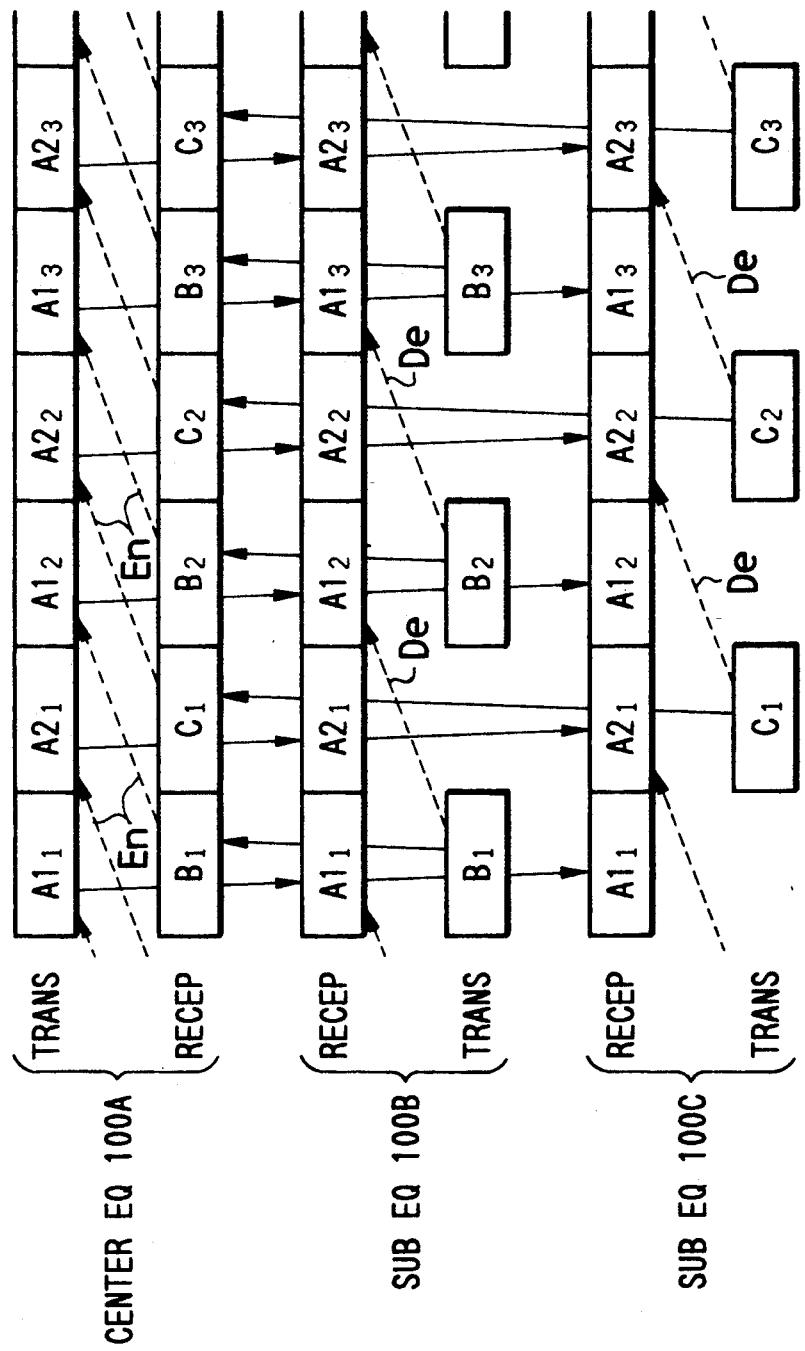
FIG. 19 is a timing chart showing an example of communication in the secure transmission system of the present invention which employs up-stream and down-stream transmission lines separately.

FIG. 19 is a timing chart showing an example of a transmission system for transmitting upward and downward signals over different optical fiber lines or at different wavelengths. This transmission system has its feature in that the center equipment 100A is capable of successively transmitting signals $A1_1$, $A1_2$, . . . , and $A2_1$, $A2_2$, . . . to the pieces of subscriber equipment on a time division multiplexed basis in the time slots preassigned to them and at the same time is capable of successively receiving transmitted signals $B_1$, $B_2$, . . . and $C_1$, $C_2$, . . . from the pieces of subscriber equipment 100B and 100C on a time division multiplexed basis.

In any of the transmission systems described above with respect to FIGS. 17 through 19, when the transmission capacities of the upward and downward signals in the communication between the center equipment 100A and each of the pieces of subscriber equipment 100B and 100C is asymmetrical, it will suffice to use part of the received information signal for encrypting the information signal to be transmitted or use the same received information signal for a series of transmission signals a plurality of times.

As described above, the secure communication equipment according to the present invention has a construction in which the information signal to be transmitted is encrypted by a conversion part through utilization of a decoded received signal or received encrypted signal and is transmitted, the transmission information signal or the encrypted information signal is stored as a key information signal in an information memory until a response information signal from the called party is received, and the received encrypted signal is decoded in an inverse conversion part through utilization of the key information read out of the information memory. Since the pieces of information for encrypting and decoding use are successively changing, it is possible to realize secure communication equipment which permit highly secure communication. Moreover, the secure transmission system according to the present invention, which has at least two pieces of communication equipment interconnected via a transmission line, has a construction in which a first piece of communication equipment transmits an information signal to the second piece of communication equipment after encrypting it in a conversion part through utilization of the previously received signal, and the second communication equipment decodes the received encrypted information signal in an inverse conversion part through utilization of a key information signal which is the immediately preceding key information stored in the information memory. Since the received signals for encrypting use are successively changing, it is possible to obtain a highly secure transmission system.

It will be apparent that many modifications and variations may be effected without departing from the scope of the novel concepts of the present invention.

What is claimed is:

1. A secure transmission system wherein at least first and second communication equipments are connected to one another iva a transmission medium;

wherein said first communication equipment includes: first receiving means for receiving a signal supplied from said second communication equipment via said transmission medium; converting means for generating an encrypted signal by encrypting an information signal to be transmitted to said second communication equipment, by use of a signal corresponding to said received signal from said second communication equipment, output from said first receiving means; and first transmitting means for providing said encrypted signal onto said transmission medium;

wherein said second communication equipment includes: information storage means for storing, as key information, a signal corresponding to an information signal to be transmitted to said first communication equipment; second transmitting means for providing said transmission signal onto said transmission medium; second receiving means for receiving said encrypted signal supplied from said first communication equipment via said transmission medium; and inverse conversion means for decoding said encrypted signal received by said second receiving means, through utilization of said key information corresponding to the preceding transmitted information signal provided from said information storage means and for outputting said decoded information signal; and wherein said converting means of said first communication equipment includes first random pattern generating means having input information supplied thereto by a received signal from said second communication equipment and operative to generate a random pattern corresponding to said input information, and first logical operation means for generating said encrypted signal by performing a logical operation of said generated random pattern and said information signal to be transmitted; and wherein said inverse conversion means of said second communication equipment includes second random pattern generating means which is identical in construction with said first random pattern generating means and is supplied as input information with said key information from said information storage means and generates a random pattern corresponding to said input information, and second logical operation means for decoding said encrypted signal by performing a logical operation of said random pattern generated by said second random pattern generating means and said received encrypted signal.

2. The secure transmission system of claim 1, wherein said first communication equipment includes scrambling means for randomizing said transmission information signal and providing it to said converting means, and said second communication equipment includes descrambling means for inversely randomizing the output signal of said inverse conversion means to decode said transmitted information signal.

3. The secure transmission system of claim 1, wherein said second communication equipment includes scrambling means for randomizing said transmission signal and providing it to said second transmitting means, and said first communication equipment includes descrambling means for inversely randomizing and outputting said received signal from said first receiving means.

4. The secure transmission system of any one of claims 2 or 3, wherein said first logical operation means is first exclusive OR means and said second logical operation means is second exclusive OR means.

5. The secure transmission system of claim 1, wherein said first communication equipment includes error detecting means for detecting a code error in said received signal and outputting an error detection signal, wherein said first random pattern generating means includes means which, when supplied with said error detection signal, provides a previously generated random pattern to said first logical operation means, wherein said first transmitting means transmits said encrypted signal after appending it with a code indicating an error detection, in response to said error detection signal, and wherein said second random pattern generating means of said second communication equipment includes means which provides a previously generated random pattern to said second logical operation means when supplied with said code indicating said error detection appended to said encrypted signal received by said second receiving means.

6. The secure transmission system of claim 1, wherein said first random pattern generating means includes first initial value calculating means which is supplied as input information with said received signal and determines an initial value corresponding thereto, and first random code sequence generating means in which said initial value is set and which generates a random code sequence of an initial phase corresponding to said initial value and outputs said random code sequence as said random pattern, and wherein said second random pattern generating means includes second initial value calculating means which is supplied as input information with said key information and determines an initial value corresponding thereto, and second random code sequence generating means in which said initial value is set and which generates a random code sequence of an initial phase corresponding to said initial value and outputs said random code sequence as said random pattern, said first and second initial value calculating means being identical in construction with each other and said first and second random code sequence generating means being identical in construction with each other.

7. The secure transmission system of claim 6, wherein said first and second initial value calculating means each include dividing means which divides said input information by a predetermined polynomial and outputs the resulting residue as said initial value, and wherein said first and second random sequence generating means each include non-linear operation means for generating a random pattern by a non-linear operation through use of at least part of said residue.

8. The secure transmission system of claim 7, wherein said non-linear operation means is a second-order or higher-order recursive filter.

9. The secure transmission system of claim 1, wherein said first and second random pattern generating means each includes counter means for counting the number of logical values of either a "1" or "0" in said input information for a predetermined period of time, pattern generating means for generating a predetermined number of random patterns, and pattern selecting means for selectively outputting one of said predetermined number of random patterns in accordance with the count value of said counter means.

10. The secure transmission system of claim 1, wherein said first and second random pattern generating means each includes: ID holding means for holding an identification number of said secure communication equipment; a logical operation circuit for logically operating said input information and at least a part of said identification number; decoder means which outputs a detection signal upon detecting that said input information is either all zeros or all ones; fixed pattern holding means for holding a predetermined fixed pattern except patterns of all zeros and all ones; and switching means which normally outputs the output of said logical operation circuit as said random pattern but, when supplied with said detection signal from said decoder means, outputs said fixed pattern held by said fixed pattern holding means.

11. The secure transmission system of claim 1, wherein said first and second random pattern generating means each have pattern degenerating means which degenerates a plurality of different random patterns to the same random pattern and provides it to the corresponding one of said first and second logical operation means.

12. A secure transmission system wherein at least first and second communication equipments are connected to one another via a transmission medium;
wherein said first communication equipment includes: first receiving means for receiving a signal supplied from said second communication equipment via said transmission medium; converting means for generating an encrypted signal by encrypting an information signal to be transmitted to said second communication equipment, by use f a signal corresponding to said received signal from said second communication equipment, output from said first receiving means; and first transmitting means for providing said encrypted signal onto said transmission medium;
wherein said second communication equipment includes: information storage mans for storing, as key information, a signal corresponding to an information signal to be transmitted to said first communication equipment; second transmitting means for providing said transmission signal onto said transmission medium; second receiving means for receiving said encrypted signal supplied from said first communication equipment via said transmission medium; and inverse conversion means for decoding said encrypted signal received by said second receiving means, through utilization of said key information corresponding to the preceding transmitted information signal provided from said information storage means and for outputting said decoded information signal;
wherein third communication equipment identical in construction with said second communication equipment is provided, said transmission medium is an optical fiber transmission line, and said second and third communication equipments are connected by optical directional splitting means to said optical fiber transmission line;
wherein said converting means of said first communication equipment includes first and second conversion parts whereby information signals to be transmitted to said second and third communication equipments are encrypted using signals received therefrom, said first transmitting means includes multiplexing means for multiplexing said encrypted signals from said first and second conversion parts and an optical transmitting circuit for providing said multiplexed signal onto said optical fiber transmission line, said first receiving means includes a first optical receiving circuit for receiving a multiplexed signal from said optical fiber transmission line and demultiplexing means for demultiplexing said multiplexed signal received from said first optical receiving circuit into signals received from said second and third communication equipments; and
wherein said second receiving means of each of said second and third communication equipments includes a second optical receiving circuit for receiving a multiplexed signal from said optical directional splitting means and a demultiplexing circuit whereby the received signal destined for the concerned one of said second and third communication equipments is demultiplexed from said received multiplexed signal.

13. A secure transmission system wherein at least first and second communication equipments are connected to one another via a transmission medium;
wherein said first communication equipment includes: first receiving means for receiving a signal supplied from said second communication equipment via said transmission medium; converting means for generating an encrypted signal by encrypting an information signal to be transmitted to said second communication equipment, by use f a signal corresponding to said received signal from said second communication equipment, output from said first receiving means; and first transmitting means for providing said encrypted signal onto said transmission medium;

wherein said second communication equipment includes: information storage mans for storing, as key information, a signal corresponding to an information signal to be transmitted to said first communication equipment; second transmitting means for providing said transmission signal onto said transmission medium; second receiving means for receiving said encrypted signal supplied from said first communication equipment via said transmission medium; and inverse conversion means for decoding said encrypted signal received by said second receiving means, through utilization of said key information corresponding to the preceding transmitted information signal provided from said information storage means and for outputting said decoded information signal; and wherein third communication equipment identical in construction with said second communication equipment is provided and is connected via said transmission medium to said first communication equipment;

wherein said first receiving means of said first communication equipment includes a first receiving circuit for receiving via said transmission medium a multiplexed signal composed of signals sent out from said second and third communication equipments and multiplexed with each other, demultiplexing means for demultiplexing said multiplexed signal into received signals from said second and third communication equipments, first and second information memories for storing, as pieces of key information, signals corresponding to information signals to be transmitted to said second and third communication equipments, and first and second inverse conversion parts whereby said demultiplexed received signals are decoded using said pieces of key information from said first and second information memories corresponding to said demultiplexed received signals, respectively, to thereby obtain decoded information signals;

wherein said converting means of said first communication equipment includes first and second conversion parts whereby information signals to be transmitted to said second and third communication equipments are encrypted using said decoded information signals from said first and second inverse conversion parts to thereby obtain encrypted information signals, and said first transmitting means includes multiplexing means for multiplexing said encrypted information signals from said first and second conversion parts and a first transmitting circuit for providing said multiplexed signal onto said transmission line; and wherein said second receiving means of each of said second and third communication equipments includes a second receiving circuit for receiving said multiplexed signal via said transmission line and a demultiplexing circuit whereby a received signal destined for a particular one of said communication equipments is demultiplexed from said received multiplexed signal and is then provided to said inverse conversion means, and said second transmitting means includes a conversion part whereby an information signal to be transmitted to said first communication equipment is encrypted using a signal corresponding to said decoded information signal from said inverse conversion means and a second transmitting circuit for providing said encrypted information signal onto said transmission medium.

14. The secure transmission system of claim 12 or 13, wherein said first and second conversion parts of said first communication equipment include first and second exclusive OR means for obtaining exclusive OR's of said information signals to be transmitted to said second and third communication equipments and signals corresponding to said signals received therefrom and for outputting said exclusive OR's as said encrypted signals, and wherein said inverse conversion parts of said second and third communication equipments each include an exclusive OR circuit for outputting as said decoded information signal the exclusive OR of said signal corresponding to said key information read out of said information storage means and said demultiplexed received signal.

15. The secure transmission system of claim 12 or 13, wherein said first and second conversion parts of said first communication equipment respectively include first and second random pattern generating means which are supplied, as input information, with signals corresponding to said signals received from said second and third communication equipments and produce random patterns determined by said input information, and first and second logical operation means for performing logical operations of said random patterns generated by said first and second random pattern generating means and said information signals to be transmitted to said second and third communication equipments and for outputting the results of said logical operations as said encrypted signals; and wherein said conversion means of said second and third communication equipments each include third and fourth random pattern generating means which are supplied, as input information, with signals corresponding to said key information read out of said information storage means and generate random patterns determined by said input information, and third and fourth logical operation means which perform inverse logical converting operations of said random patterns generated by said third and fourth random pattern generating means and said received signal demultiplexed by said demultiplexing circuit for outputting the results of said inverse logical converting operations as said decoded information signal, said first and second random pattern generating means being identical in construction with said third and fourth random pattern generating means, respectively.

16. Secure communication equipment comprising:

receiving means for receiving a signal supplied via a transmission medium;

converting means for producing an encrypted signal by a logical conversion of a transmission information signal through utilization of at least one part of a signal corresponding to said received signal from said receiving means;

transmitting means for providing said encrypted signal onto said transmission medium;

information storage means for storing, as key information, a signal corresponding to said transmission information signal;

inverse conversion means for obtaining a decoded information signal by decoding said received signal from said receiving means through an inverse logical conversion of said received signal by use of said key information read out of said information storage means;

said converting means including first random pattern generating means for generating a random pattern through use of at least one part of said signal corresponding to said received signal, and first logical operation means for performing a logical operation of said random pattern from said first random pattern generating means and said transmission information signal and outputting said encrypted signal; and said inverse conversion means including second random pattern generating means for generating a random pattern through use of at least one part of said key information read out of said information storage means, and second logical operation means for performing a logical operation of said random pattern from said second random pattern generating means and said received signal and outputting said decoded information signal.

17. The secure communication equipment of claim 16, wherein at least one of said first and second random pattern generating means includes counter means for counting the number of logical values of either a "1" or "0" in said input information for a predetermined period of time, pattern generating means for generating a predetermined number of random patterns, and pattern selecting means for selectively outputting one of said predetermined number of random patterns in accordance with the count value of said counter means.

18. The secure communication equipment of claim 16, wherein at least one of said first and second random pattern generating means includes: ID holding means for holding an identification number of said secure communication equipment; a logical operation circuit for logically operating said input information and said identification number; decoder means which outputs a detection signal upon detecting that said input information is all zeros or all ones; fixed pattern holding means for holding a predetermined fixed pattern except patterns of all zeros and all ones; and switching means which normally outputs the output of said logical operation circuit as said random pattern but, when supplied with said detection signal from said decoder means, outputs said fixed pattern held by said fixed pattern holding means.

19. The secure communication equipment of claim 16, which further comprises scrambling means for randomizing said transmission information signal and providing it to said conversion means and descrambling means for inversely randomizing and outputting said decoded output of said inverse conversion means.

20. The secure communication equipment of claim 16, wherein said non-linear operation means is a second-order or high-order recursive filter.

21. The secure communication equipment of claim 16, wherein said receiving means includes error detecting means for detecting a code error in said received signal and for outputting an error detecting signal; said first random pattern generating means includes means responsive to said error detection signal to supply said first logical operation means with a random pattern generated immediately before; said transmitting means includes means responsive to said error detection signal to append said encrypted signal with a code indicating said error detection; and said second random pattern generating means includes means responsive to the reception of said error detection indicating code by said receiving means to supply said second logical operation means with a random pattern generated immediately before.

22. The secure communication equipment of claim 16, wherein at least one of said first and second logical operation means is an exclusive OR circuit.

23. The secure communication equipment of claim 16, wherein at least one of said first and second random pattern generating means includes pattern degenerating means for degenerating a plurality of different random patterns to the same random pattern and for providing it to a corresponding one of said first and second logical operation means.

24. The secure communication equipment of claim 16, wherein at least one of said first and second random pattern generating means includes dividing means for dividing said input information by a predetermined polynomial and for outputting the resulting residue and non-linear operation means for generating a random pattern by a non-linear operation through utilization of said residue.

* * * * *